(12) United States Patent
Kim et al.

(10) Patent No.: US 6,986,080 B2
(45) Date of Patent: Jan. 10, 2006

(54) TIMING ERROR DETECTOR FOR DIGITAL SIGNAL RECEIVER

(75) Inventors: Jin H. Kim, Lake Zurich, IL (US); Mark Fimoff, Hoffman Estates, IL (US); Serdar Ozen, West Lafayette, IN (US)

(73) Assignee: Zenith Electronics Corporation, Lincolnshire, IL (US)

( * ) Notice: Subject to any disclaimer, the term of this patent is extended or adjusted under 35 U.S.C. 154(b) by 617 days.

(21) Appl. No.: 10/152,488

(22) Filed: May 21, 2002

(65) Prior Publication Data

US 2003/0221142 A1    Nov. 27, 2003

(51) Int. Cl.
G11B 5/00    (2006.01)

(52) U.S. Cl. .................................... 714/700
(58) Field of Classification Search ................ 714/700, 714/746, 755, 758, 789, 798
See application file for complete search history.

(56) References Cited

U.S. PATENT DOCUMENTS 5,790,607 A * 8/1998 Burke et al. ................ 375/355
5,793,818 A * 8/1998 Claydon et al. ............. 375/326
6,359,878 B1 * 3/2002 Lakkis et al. ............... 370/350
6,430,235 B1 * 8/2002 O'Shea et al. .............. 375/326

OTHER PUBLICATIONS

Gardner, "A BPSK/QPSK Timing-Error Detector for Sampled Receivers", IEEE Transactions on Communication, vol. COM-34, No. 5, May 1986, pp. 423-429.
Litwin, "Matched Filtering and Timing Recovery in Digital Receivers", Sep. 2001.
Gardner, "Interpolation in Digital Modems—Part 1: Fundamentals", vol. 41, No. 3, Mar. 1993, IEEE Transactions on Communications.

* cited by examiner

Primary Examiner—Albert Decady
Assistant Examiner—James C. Kerveros

(57) ABSTRACT

A received signal having a series of T-spaced symbols having more than two levels is sampled at a rate that produces successive samples $S_P$, $S_C$, and $S_N$ substantially equally spaced by T/2. An output representing the difference between the sign of the sample $S_N$ and the sign of the sample $S_P$ is generated, and the value of the sample $S_C$ is offset so that the value of the sample $S_C$ approaches zero. The offset value of the sample $S_C$ and the generated output are multiplied together in order to provide a timing error signal. The sampling of the received signal is controlled in accordance with the timing error signal.

29 Claims, 3 Drawing Sheets

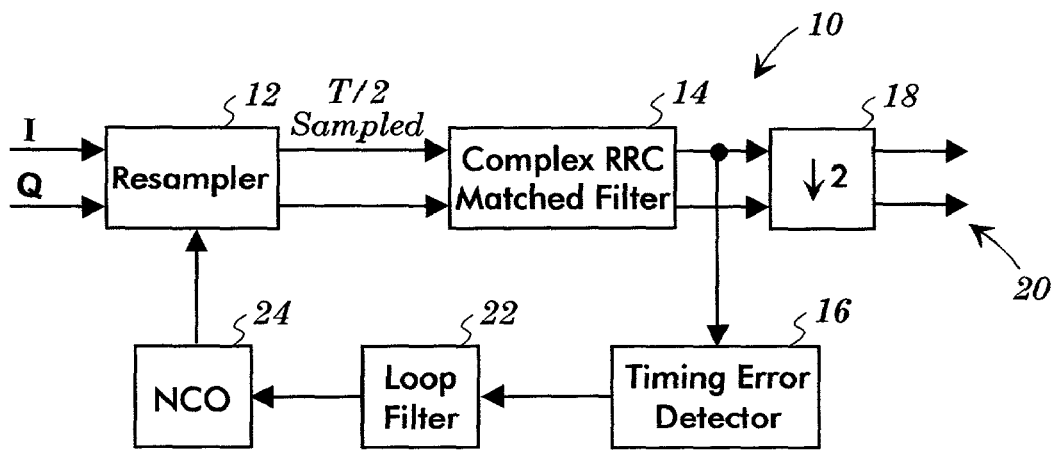
*Figure 1 - Prior Art*
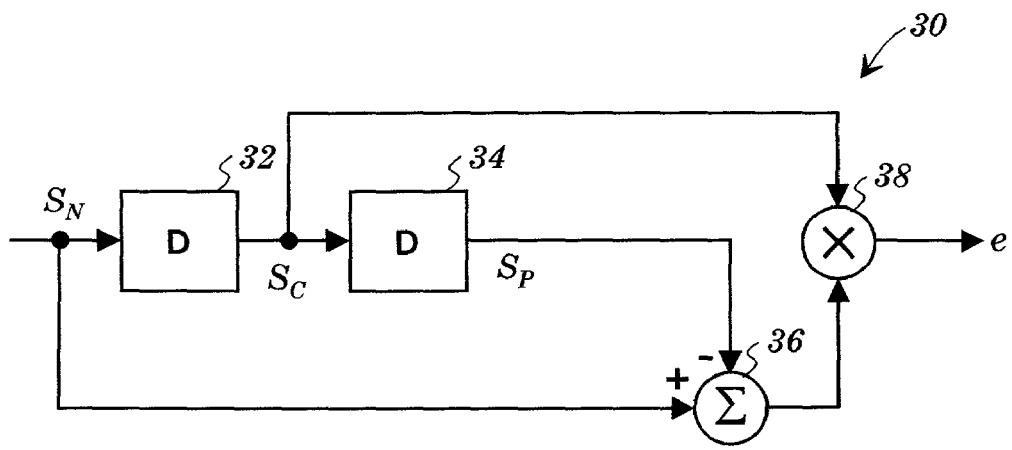
*Figure 2 - Prior Art*
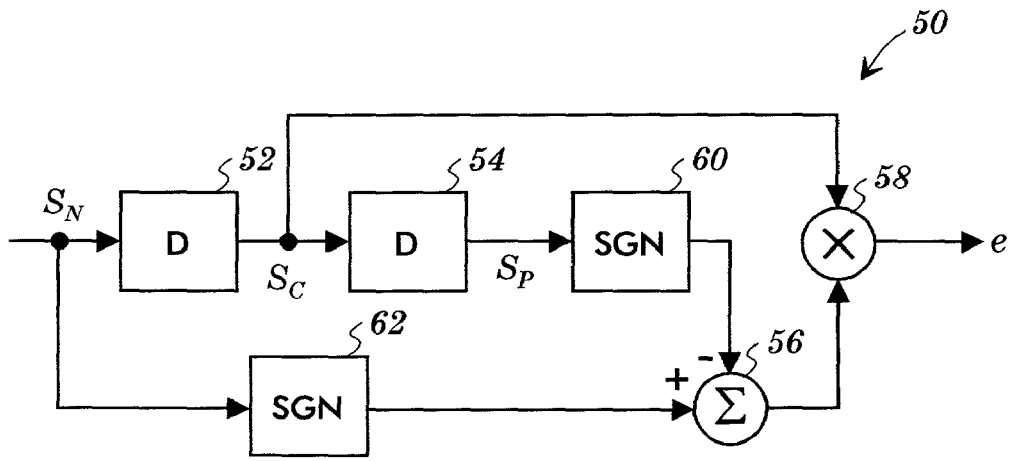
*Figure 3 - Prior Art*

TIMING ERROR DETECTOR FOR DIGITAL SIGNAL RECEIVER

TECHNICAL FIELD OF THE INVENTION

The present invention relates to a timing error detector for a digital signal receiver.

BACKGROUND OF THE INVENTION

In digital receivers, it is important to obtain symbol synchronization by accurately sampling the received signal. A common technique to achieve accurate symbol sampling employs a timing error detector for controlling a numerically controlled oscillator in order to sample the received signal at the proper sampling times.

A typical example of a digital receiver incorporating a timing error detector is depicted in FIG. 1 as a digital receiver 10. The I and Q components of a demodulated digital signal are supplied to a resampler 12 of the digital receiver 10. The resampler 12 samples the demodulated I and Q components at twice the symbol rate. Thus, the resampler 12 provides two over-sampled sequences of T/2 sampled multibit symbol values (T=symbol period). The sampled signals are passed through a Root Raised Cosine (RRC) matched filter 14 to the input of a timing error detector 16. Also, a downsampler 18 downsamples the output of the Root Raised Cosine matched filter 14 by a factor of two in order to provide on an output 20 the multibit symbol values at the symbol rate.

The timing error detector 16 develops a timing error signal that is fed back through a loop filter 22 to adjust a numerically controlled oscillator 24 so as to provide a sampling control signal that accurately controls the resampler 12.

The so-called Gardner timing error detector is a known circuit that can be used for the timing error detector 16 of FIG. 1. A Gardner timing error detector 30 is shown in FIG. 2. The timing error detector 30 comprises two T/2 delay elements 32 and 34, a summer 36, and a multiplier 38. The timing error detector 30 receives multibit input samples at twice the symbol rate, and generates an output timing error signal for controlling the numerically controlled oscillator 24.

Accordingly, $S_N$ represents the current sample being input to the timing error detector 30, $S_C$ represents a sample which was input to the timing error detector 30 T/2 before the sample $S_N$, and $S_P$ represents a sample which was input to the timing error detector 30 T/2 before the sample $S_C$. The summer 36 subtracts the sample $S_P$ from the sample $S_N$, and the multiplier 38 multiplies the result by the sample $S_C$ in order to produce a timing error e. Accordingly, the timing error detector 30 of FIG. 2 detects the timing error e according to the following equation:

$$e=S_C(S_N-S_P) \quad (1)$$

A waveform 40 representing the envelope of a demodulated received signal having binary valued symbols +1 and −1 is shown in FIG. 4. As can be seen from FIG. 4, the amplitude of the signal envelope of the waveform 40 at vertical lines 42 represents the received symbols. Proper sampling synchronization is achieved when the numerically controlled oscillator 24 of FIG. 1, in response to the filtered timing error signal e, produces a sampling signal for operating the resampler 12 to sample the waveform 40 at the sampling times represented by the circles along the horizontal axis of FIG. 4. This timing produces samples in exact time coincidence with the first two symbols and with one zero value sample in between these symbols.

In the case of proper sample timing as shown in FIG. 4, $S_C=0$ so that the timing error e is zero and so that no adjustment is made to the numerically controlled oscillator 24. However, if the sampling signal lags the desired sampling signal, such as indicated by the squares in FIG. 4, the timing error e will be approximately e= −0.1(0.9−(−0.9)) =−0.18 according to equation (1), where $S_C$=−0.1, $S_N$=0.9, and $S_P$=−0.9 in this example. This timing error e is filtered by the loop filter 22 and is applied to the numerically controlled oscillator 24 so as to provide an adjustment to the resampler 12 tending to reduce the timing error e by causing sampling to occur slightly earlier in time.

Accordingly, if the sampling signal produced in response to the numerically controlled oscillator 24 is adjusted to cause sampling to occur in a leading relation to the desired sampling as represented by the triangles in FIG. 4, the timing error e will be approximately e= 0.1(0.9−(−0.9))=0.18 according to equation (1), where $S_C$ =0.1, $S_N$=0.9, and $S_P$=−0.9 in this example. The result is that the timing error detector 30 operates the numerically controlled oscillator 24 to cause sampling to occur at or near the desired sampling points shown by the circles in FIG. 4.

The modified Gardner timing error detector is another known circuit that can be used for the timing error detector 16 of FIG. 1. FIG. 3 illustrates a modified Gardner timing error detector 50, which operates essentially in the same manner as the timing error detector 30 of FIG. 2. The timing error detector 50 reduces the effects of noise by using only the sign of $S_N$ and $S_P$. The timing error detector 50 comprises two T/2 delay elements 52 and 54, a summer 56, a multiplier 58, and two sign operators 60 and 62. The timing error detector 50 also receives multibit input samples at twice the symbol rate, and generates an output timing error e for controlling the numerically controlled oscillator 24.

Accordingly, $S_N$ represents the current sample being input to the timing error detector 50, $S_C$ represents a sample which was input to the timing error detector 50 T/2 before the sample $S_N$, and $S_P$ represents a sample which was input to the timing error detector 50 T/2 before the sample $S_C$. The summer 56 subtracts a binary value having the sign of the sample $S_P$ from a binary value having the sign of the sample $S_N$, and the multiplier 58 multiplies the result by the sample $S_C$ to produce the timing error e. Accordingly, the timing error detector 50 of FIG. 3 detects the timing error e according to the following equation:

$$e=S_C[sgn(S_N)-sgn(S_P)] \quad (2)$$

The timing error detectors 30 and 50 were designed for use in digital systems using binary valued symbols. Thus, although the timing error detectors 30 and 50 work relatively well with binary valued symbols, they do not work as well with symbols having more than two levels, such as those used in 8-VSB systems or in 16, 64, or 256 QAM systems.

The present invention provides an improved timing error detector for use when data having more than two levels, such as 8-VSB (8 level PAM) symbols or multi-level QAM symbols, are received. Thus, a Gardner-type timing error detector according to an embodiment of the present invention provides improved performance when used in systems employing multilevel symbol constellations. Such systems have more than two symbol levels and include, for example, pulse amplitude modulation (PAM) and quadrature amplitude modulation (QAM) systems. The improved performance obtained by the present invention contemplates faster convergence of the receiver with less noise.

SUMMARY OF THE INVENTION

In accordance with one aspect of the present invention, a method is provided to control sampling of a received signal having a series of T-spaced symbols having more than two levels. The method comprises the following: sampling the received signal at a rate that produces successive samples $S_P$, $S_C$, and $S_N$ substantially equally spaced by T/2; generating an output representing the difference between the sign of the sample $S_N$ and the sign of the sample $S_P$; offsetting the value of the sample $S_C$ to approach a value of zero; multiplying the offset value of the sample $S_C$ and the generated output to provide a timing error signal; and, controlling the sampling of the received signal in accordance with the timing error signal.

In accordance with another aspect of the present invention, a method is provided to control sampling of a received signal having a series of T-spaced symbols having more than two levels comprises the following: sampling an I component of the received signal at a rate that produces successive first samples $S_P$, $S_C$, and $S_N$ substantially equally spaced by T/2; generating a first output based on the sign of the first sample $S_N$ and on the sign of the first sample $S_P$; offsetting the value of the first sample $S_C$ to approach a value of zero; applying the offset value of the first sample $S_C$ to the generated first output to provide a first timing error signal; sampling a Q component of the received signal at a rate that produces successive second samples $S_P$, $S_C$, and $S_N$ substantially equally spaced by T/2; generating a second output based on the sign of the second sample $S_N$ and on the sign of the second sample $S_P$; offsetting the value of the second sample $S_C$ to approach a value of zero; applying the offset value of the second sample $S_C$ to the generated second output to provide a second timing error signal; combining the first and second timing error signals to produce a composite timing error signal; and, controlling the sampling of the received signal in accordance with the composite timing error signal.

In accordance with still another aspect of the present invention, a method is provided to control sampling of a received signal having a series of T-spaced symbols having more than two levels. The method comprises the following: sampling the received signal at a rate to produce successive samples $S_P$, $S_C$, and $S_N$ so that the spacing between the successive samples $S_P$, $S_C$, and $S_N$ is substantially equal to T/2; forming a first difference based upon the samples $S_N$ and $S_P$; forming a sum based upon the samples $S_N$ and $S_P$; forming a second difference based upon the sample $S_C$ and the sum; multiplying the first and second differences to produce a timing error; and, controlling the sampling of the received signal in accordance with the timing error signal.

BRIEF DESCRIPTION OF THE DRAWINGS

These and other features and advantages will become more apparent from a detailed consideration of the invention when taken in conjunction with the drawings in which:

FIG. 1 illustrates a typical digital receiver incorporating a timing error detector;

FIG. 2 shows a prior art Gardner timing error detector that has been used in the digital receiver of FIG. 1;

FIG. 3 shows a prior art modified Gardner timing error detector that has been used in the digital receiver of FIG. 1;

DETAILED DESCRIPTION

The Gardner-type timing error detector according to at least one embodiment of the present invention provides better performance with symbols having more than two levels. This better performance is achieved by modifying the Gardner timing error detector to operate on multi-level symbols as though the multi-level symbols were binary valued symbols.

Figure 5:
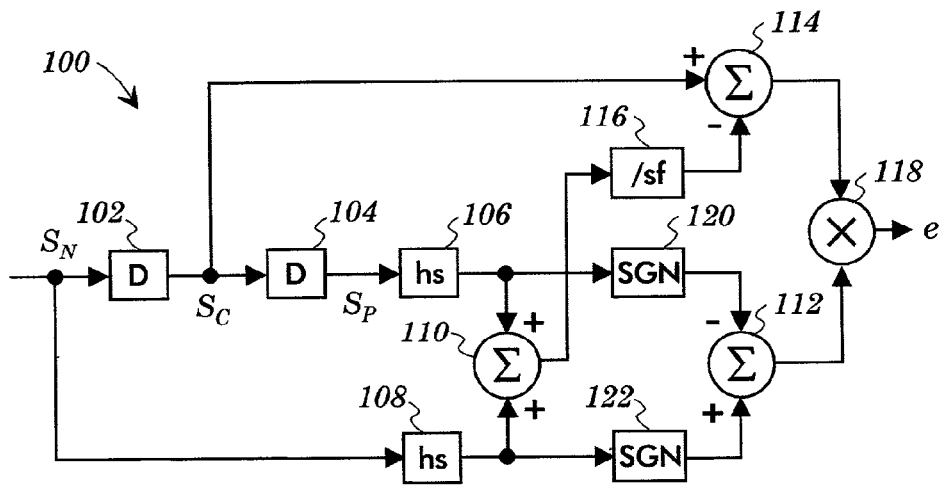
FIG. 5 shows an improved Gardner-like timing error detector according to one embodiment of the present invention.

A timing error detector 100 according to one embodiment of the present invention is shown in FIG. 5. The timing error detector 100 is similar to the timing error detector 50 of FIG. 3 except that (i) hard slicers have been added to hard slice the samples $S_N$ and $S_P$, and (ii) the sample $S_C$ is modified by an expression that includes a scaling factor sf.

Accordingly, the timing error detector 100 comprises two T/2 delay elements 102 and 104, two hard slicers 106 and 108, three summers 110, 112, and 114, a scaling factor operator 116, a multiplier 118, and two sign operators 120 and 122. The timing error detector 100 receives the multibit input samples $S_N$ at twice the symbol rate, and generates an output timing error signal for controlling the numerically controlled oscillator 24.

The timing error detector 100 is characterized by the following equation:

$$e = S_C^* [sgn(hs(S_N)) - sgn(hs(S_P))] \qquad (3)$$

where $$S_C^* = S_C - \frac{(hs(S_N) + hs(S_P))}{sf} \qquad (4)$$

The use of the two sign operators 120 and 122 together with the modified sample $S_C^*$ tends to operate the timing error detector 100 in response to multivalue symbols as if they were binary valued. This operation of the timing error detector 100 is accomplished by reducing the samples $S_N$ and $S_P$ to their respective signs (which are binary) and by adjusting the value of the sample $S_C$ so that it approaches a zero value in accordance with the corresponding binary sample of FIG. 4.

Consider the example of an 8-VSB signal having nominal symbol values of +7, +5, +3, +1, −1, −3, −5 and −7. The scaling factor sf is derived by setting $S_C^*$ in equation (4) to zero and by then solving for the scaling factor sf. Accordingly, the scaling factor sf is given by the following equation:

$$sf = \left| \frac{hs(S_N) + hs(S_P)}{S_C} \right| \qquad (5)$$

If it is assumed in the VSB example given above that $S_N = -1$ and $S_P = +5$, a properly sampled signal with a root raised cosine envelope results in the sample $S_C$ having a value of 2.54. In this case, the scaling factor sf is given as follows:

$$sf = \left|\frac{-1+5}{2.54}\right| = 1.6$$

Other values for the samples $S_N$ and $S_P$ will result in a scaling factor sf of approximately the same value.

Figure 6:
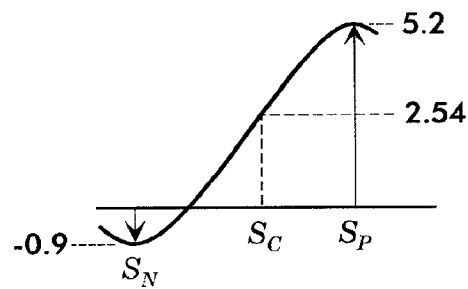
FIG. 6 shows a waveform useful in explaining the timing error detector of FIG. 5; and, FIG. 7 shows an improved Gardner-like timing error detector according to another embodiment of the present invention.

Then, let it be assumed that a received signal actually produces values for the samples $S_N$, $S_C$, and $S_P$ of −0.9, +2.54, and +5.2, respectively, as shown in FIG. 6. With a value of 1.6 for the scaling factor sf, the modified sample $S_C^*$ is given as follows:

$$S_C^* = 2.54 - \frac{(-1+5)}{1.6} = 0$$

Accordingly, as can be seen by equations (3) and (4), the timing error e=0. If, on the other hand, the received signal resulted in the sample $S_C$ being smaller or larger than 2.54, a timing error e would be produced to adjust the sampling signal so as to reduce the timing error.

Consider another example where the received signal produces values for the samples $S_N$, $S_C$, and $S_P$ of −5.2, −2.54, and +0.9, respectively. With a value of 1.6 for the scaling factor sf, the modified sample $S_C^*$ in this case is given as follows:

$$S_C^* = -2.54 - \frac{(-5+1)}{1.6} = 0$$

Again, as can be seen by equations (3) and (4), the timing error e=0. Also, as before, if the sample $S_C$ were larger or smaller than −2.54, a timing error e would be produced to adjust the sampling.

Consider a final example where the received signal results in the samples $S_N$, $S_C$, and $S_P$ having values of −3, 2.0, and 7.0, respectively. With a value of 1.6 for the scaling factor sf, the modified sample $S_C^*$ in this case is given as follows:

$$S_C^* = 2.0 - \frac{(-3+7)}{1.6} = -0.5$$

Accordingly, as can be seen by equation (3), the timing error e is given as follows:

$$e = -0.5[(-1)-(+1)] = +1.0$$

Similar examples can be shown for other values of the samples $S_N$, $S_P$ and $S_C$.

Figure 4:
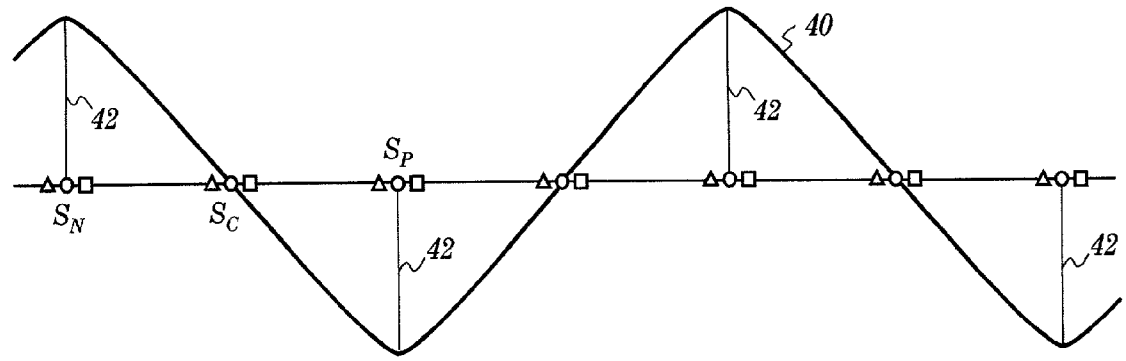
FIG. 4 shows a waveform useful in explaining the prior art Gardner timing error detectors.

It will be observed that the effect of the subtraction made by the summer 114 in accordance with equation (4) is to reduce the y-axis offset in the envelope of FIG. 6 so that this envelope, in effect, appears like the envelope of FIG. 4 where the sampled value between the samples $S_N$ and $S_P$ has a zero value when proper sampling timing is achieved.

Figure 7:
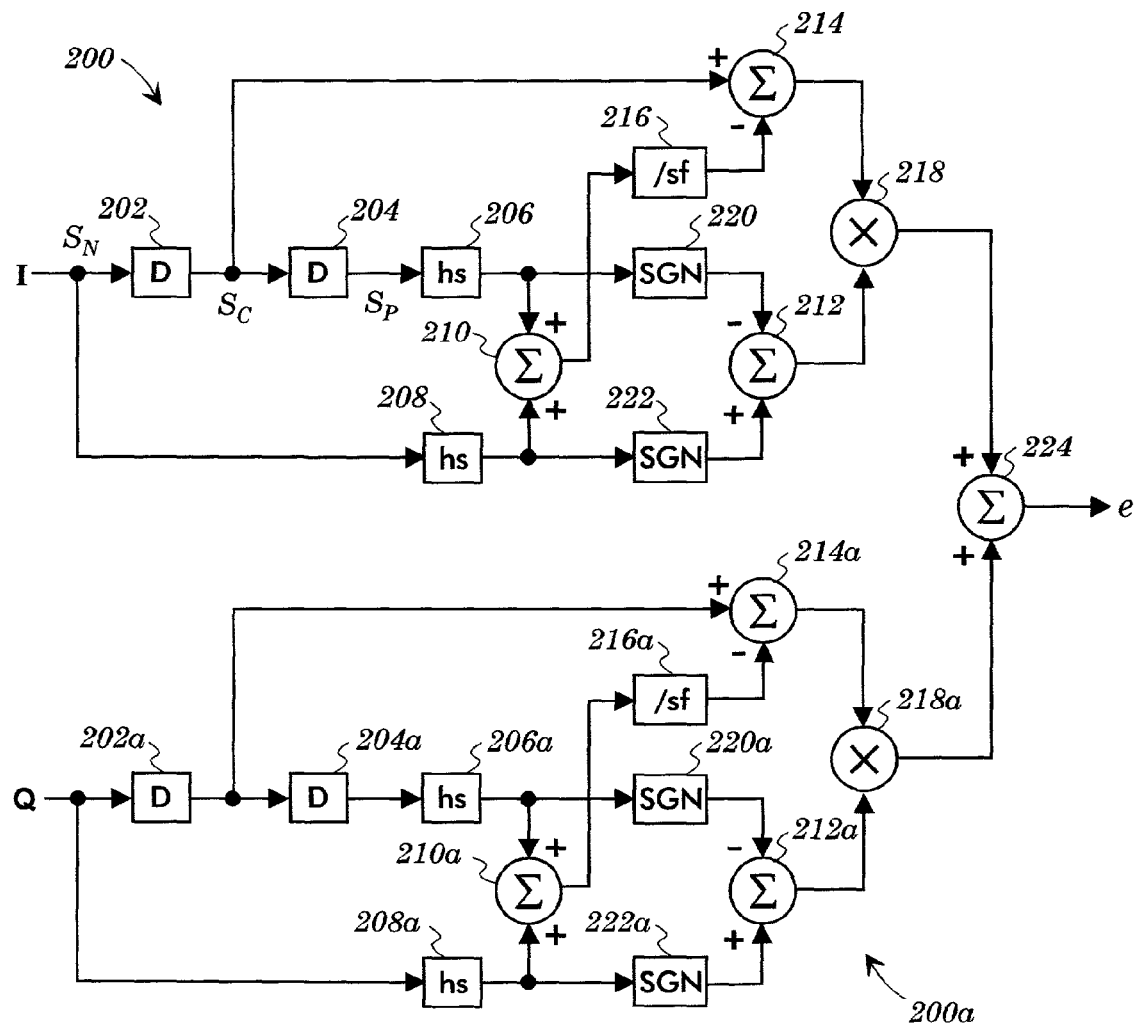

The timing error detector 100 of FIG. 5 can be used to process one of the I and Q demodulated signals. A further improvement is shown by the embodiment of FIG. 7 in which two timing error detectors 200 and 200a are combined, where the timing error detector 200 processes the I signal and the timing error detector 200a processes the Q signal. The timing error detectors 200 and 200a are each similar to the timing error detector 100 of FIG. 5.

Accordingly, the timing error detector 200 comprises two T/2 delay elements 202 and 204, two hard slicers 206 and 208, three summers 210, 212, and 214, a scaling factor operator 216, a multiplier 218, and two sign operators 220 and 222. Similarly, the timing error detector 200a comprises two T/2 delay elements 202a and 204a, two hard slicers 206a and 208a, three summers 210a, 212a, and 214a, a scaling factor operator 216a, a multiplier 218a, and two sign operators 220a and 222a.

Each of the timing error detectors 200 and 200a is characterized by the equations (3) and (4). The timing error e from the timing error detector 200 and the timing error e from the timing error detector 200a are added by a summer 224 to produce a composite timing error $e_C$. The timing error detectors 200 and 200a of FIG. 7 produce an improvement in the time necessary to converge the error signal in a VSB system.

In particular, a characteristic of a VSB system is that, when two successive symbols of the I signal do not produce a transition about zero (i.e., both have the same sign), the corresponding symbols of the Q signal will be characterized by such a transition, and visa versa. In this case (two I symbols of the same sign), the timing error detector 200 will not produce an updated error signal in response to the I signal, but the timing error detector 200a will produce an updated error signal in response to the Q signal, and visa versa. The error signal supplied to the numerically controlled oscillator 24 will, therefore, be updated at a faster rate than if the I signal alone were being used.

Certain modification of the present invention have been discussed above. Other modifications of the present invention will occur to those practicing in the art of the present invention. For example, if it is not desired to demodulate the received signal so as to produce the Q signal, the Q signal may be approximated from the I signal, and this approximation may be used as the input to the Q timing error detector 200a. For example, a Hilbert transform may be used to approximate the Q signal from the I signal in a VSB system.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method for controlling sampling of a received signal having a series of T-spaced symbols having more than two levels, the method comprising:

sampling the received signal at a rate that produces successive samples $S_P$, $S_C$, and $S_N$ substantially equally spaced by T/2;

generating an output representing the difference between the sign of the sample $S_N$ and the sign of the sample $S_P$;

offsetting the value of the sample $S_C$, to approach a value of zero;

multiplying the offset value of the sample $S_C$ and the generated output to provide a timing error signal; and, controlling the sampling of the received signal in accordance with the timing error signal.

2. The method of claim 1 wherein the generating of an output comprises:
   hard slicing the value of the sample $S_P$;
   hard slicing the value of the sample $S_N$; and,
   subtracting a binary value having the sign of the hard sliced value of the sample $S_P$ from a binary value having the sign of the hard sliced value of the sample $S_N$.

3. The method of claim 2 wherein
   the offsetting of the value of the sample $S_C$ to approach a value of zero comprises:
   adding the hard sliced value of the sample $S_P$ and the hard sliced value of the sample $S_N$ to produce an addition result;
   applying a scaling factor to the addition result; and,
   subtracting the scaled addition result from the sample $S_C$.

4. The method of claim 1 wherein the offsetting of the value of the sample $S_C$ to approach a value of zero comprises:
   performing an addition based on the sample $S_P$ and the sample $S_N$ to produce an addition result;
   applying a scaling factor to the addition result; and,
   subtracting the scaled addition result from the sample $S_C$.

5. The method of claim 1 wherein the generating of an output comprises:
   hard slicing the value of the sample $S_P$;
   hard slicing the value of the sample $S_N$; and,
   combining a binary value having the sign of the hard sliced value of the sample $S_P$ and a binary value having the sign of the hard sliced value of the sample $S_N$.

6. The method of claim 5 wherein the offsetting of the value of the sample $S_C$ to approach a value of zero comprises:
   combining the hard sliced value of the sample $S_P$ and the hard sliced value of the sample $S_N$ to produce a combined result;
   applying a scaling factor to the combined result; and,
   operating on the sample $S_C$ in accordance with the scaled combined result.

7. The method of claim 1 wherein the offsetting of the value of the sample $S_C$ to approach a value of zero comprises:
   performing an operation based on the sample $S_P$ and the sample $S_N$ to produce a result;
   applying a scaling factor to the result; and,
   combining the scaled result and the sample $S_C$.

8. A method for controlling sampling of a received signal having a series of T-spaced symbols having more than two levels, the method comprising:
   sampling an I component of the received signal at a rate that produces successive first samples $S_P$, $S_C$, and $S_N$ substantially equally spaced by T/2;
   generating a first output based on the sign of the first sample $S_N$ and on the sign of the first sample $S_P$;
   offsetting the value of the first sample $S_C$ to approach a value of zero;
   applying the offset value of the first sample $S_C$ to the generated first output to provide a first timing error signal;
   sampling a Q component of the received signal at a rate that produces successive second samples $S_P$, $S_C$, and $S_N$ substantially equally spaced by T/2;
   generating a second output based on the sign of the second sample $S_N$ and on the sign of the second sample $S_P$;
   offsetting the value of the second sample $S_C$ to approach a value of zero;
   applying the offset value of the second sample $S_C$ to the generated second output to provide a second timing error signal;
   combining the first and second timing error signals to produce a composite timing error signal; and,
   controlling the sampling of the received signal in accordance with the composite timing error signal.

9. The method of claim 8 wherein the generating of a first output comprises:
   hard slicing the value of the first sample $S_P$;
   hard slicing the value of the first sample $S_N$; and,
   subtracting a binary value having the sign of the hard sliced value of the first sample $S_P$ from a binary value having the sign of the hard sliced value of the first sample $S_N$; and,
   wherein the generating of a second output comprises:
   hard slicing the value of the second sample $S_P$;
   hard slicing the value of the second sample $S_N$; and,
   subtracting a binary value having the sign of the hard sliced value of the second sample $S_P$ from a binary value having the sign of the hard sliced value of the second sample $S_N$.

10. The method of claim 9 wherein the offsetting of the value of the first sample $S_C$ to approach a value of zero comprises:
    adding the hard sliced value of the first sample $S_P$ and the hard sliced value of the first sample $S_N$ to produce a first addition result;
    applying a scaling factor to the first addition result; and,
    subtracting the scaled first addition result from the first sample $S_C$; and,
    wherein the offsetting of the value of the second sample $S_C$ to approach a value of zero comprises:
    adding the hard sliced value of the second sample $S_P$ and the hard sliced value of the second sample $S_N$ to produce a second addition result;
    applying the scaling factor to the second addition result; and,
    subtracting the scaled second addition result from the second sample $S_C$.

11. The method of claim 8 wherein the offsetting of the value of the first sample $S_C$ to approach a value of zero comprises:
    performing an addition based on the first sample $S_P$ and the first sample $S_N$ to produce a first addition result;
    applying a scaling factor to the first addition result; and,
    subtracting the scaled first addition result from the first sample $S_C$; and,
    wherein the offsetting of the value of the second sample $S_C$ to approach a value of zero comprises:
    performing an addition based on the second sample $S_P$ and the second sample $S_N$ to produce a second addition result;
    applying the scaling factor to the second addition result; and,
    subtracting the scaled second addition result from the second sample $S_C$.

12. The method of claim 8 wherein the generating of a first output comprises:
    hard slicing the value of the first sample $S_P$;
    hard slicing the value of the first sample $S_N$; and,
    combining a binary value having the sign of the hard sliced value of the first sample $S_P$ and a binary value having the sign of the hard sliced value of the first sample $S_N$; and, wherein the generating of a second output comprises:
hard slicing the value of the second sample $S_P$;
hard slicing the value of the second sample $S_N$; and,
combining a binary value having the sign of the hard sliced value of the second sample $S_P$ and a binary value having the sign of the hard sliced value of the second sample $S_N$.

13. The method of claim 12 wherein the offsetting of the value of the first sample $S_C$ to approach a value of zero comprises:
combining the hard sliced value of the first sample $S_P$ and the hard sliced value of the first sample $S_N$ to produce a first result;
applying a scaling factor to the first result; and,
operating on the first sample $S_C$ in accordance with the scaled first result; and,
wherein the offsetting of the value of the second sample $S_C$ to approach a value of zero comprises:
combining the hard sliced value of the second sample $S_P$ and the hard sliced value of the second sample $S_N$ to produce a second result;
applying the scaling factor to the second result; and,
operating on the second sample $S_C$ in accordance with the scaled second result.

14. The method of claim 8 wherein the offsetting of the value of the first sample $S_C$ to approach a value of zero comprises:
performing an operation based on the first sample $S_P$ and the first sample $S_N$ to produce a first result;
applying a scaling factor to the first result; and,
operating on the first sample $S_C$ in accordance with the scaled first result; and,
wherein the offsetting of the value of the second sample $S_C$ to approach a value of zero comprises:
performing an operation based on the second sample $S_P$ and the second sample $S_N$ to produce a second result;
applying the scaling factor to the second result; and,
operating on the second sample $S_C$ in accordance with the scaled second result.

15. A method for controlling sampling of a received signal having a series of T-spaced symbols having more than two levels, the method comprising:
sampling the received signal at a rate to produce successive samples $S_P$, $S_C$, and $S_N$ so that the spacing between the successive samples $S_P$, $S_C$, and $S_N$ is substantially equal to T/2;
forming a first difference based upon the samples $S_N$ and $S_P$;
forming a sum based upon the samples $S_N$ and $S_P$;
forming a second difference based upon the sample $S_C$ and the sum;
multiplying the first and second differences to produce a timing error; and,
controlling the sampling of the received signal in accordance with the timing error signal.

16. The method of claim 15 wherein the forming of a first difference based upon the samples $S_N$ and $S_P$ comprises:
forming a first binary value based upon the sign of the sample $S_P$;
forming a second binary value based upon the sign of the sample $S_N$; and,
subtracting the first binary value from the second binary value.

17. The method of claim 16 wherein the forming of a first binary value comprises hard slicing the sample $S_P$ and forming the first binary value based upon the sign of the hard sliced sample $S_P$, and wherein the forming of a second binary value comprises hard slicing the sample $S_N$ and forming the second binary value based upon the sign of the hard sliced sample $S_N$.

18. The method of claim 17 wherein the forming of a sum based upon the samples $S_N$ and $S_P$ comprises adding the hard sliced sample $S_P$ and the hard sliced sample $S_N$.

19. The method of claim 18 wherein the forming of a sum based upon the samples $S_N$ and $S_P$ further comprises applying a scaling factor to the sum of the hard sliced sample $S_P$ and the hard sliced sample $S_N$.

20. The method of claim 19 wherein the forming of a second difference comprises subtracting the scaled sum from the sample $S_C$.

21. The method of claim 15 wherein the forming of a first difference based upon the samples $S_N$ and $S_P$ comprises hard slicing the sample $S_P$, hard slicing the sample $S_N$, and forming the first difference based upon the hard sliced sample $S_P$ and the hard sliced sample $S_N$.

22. The method of claim 21 wherein the forming of a sum based upon the samples $S_N$ and $S_P$ comprises adding the hard sliced sample $S_P$ and the hard sliced sample $S_N$.

23. The method of claim 22 wherein the forming of a sum based upon the samples $S_N$ and $S_P$ further comprises applying a scaling factor to the sum of the hard sliced sample $S_P$ and the hard sliced sample $s_N$.

24. The method of claim 23 wherein the forming of a second difference comprises subtracting the scaled sum from the sample $S_C$.

25. The method of claim 15 wherein the forming of a sum based upon the samples $S_N$ and $S_P$ comprises hard slicing the value of the sample $S_P$, hard slicing the value of the sample $S_N$, and adding the hard sliced sample $S_P$ and the hard sliced sample $S_N$.

26. The method of claim 25 wherein the forming of a sum based upon the samples $S_N$ and $S_P$ further comprises applying a scaling factor to the sum of the hard sliced sample $S_P$ and the hard sliced sample $S_N$.

27. The method of claim 26 wherein the forming of a second difference comprises subtracting the scaled sum from the sample $S_C$.

28. The method of claim 15 wherein the forming of a sum based upon the samples $S_N$ and $S_P$ comprises applying a scaling factor to a value based on the samples $S_P$ and $S_N$.

29. The method of claim 28 wherein the forming of a second difference comprises subtracting the scaled value from the sample $S_C$.

* * * * *